(12) United States Patent
Liu

(10) Patent No.: US 11,775,012 B2
(45) Date of Patent: Oct. 3, 2023

(54) FOLDABLE SCREEN AND ELECTRONIC DEVICE

(71) Applicant: Beijing Xiaomi Mobile Software Co., Ltd., Beijing (CN)

(72) Inventor: Jianwei Liu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 24 days.

(21) Appl. No.: 17/565,740

(22) Filed: Dec. 30, 2021

(65) Prior Publication Data

US 2023/0030559 A1 Feb. 2, 2023

(30) Foreign Application Priority Data

Jul. 27, 2021 (CN) .......................... 202110848755.7

(51) Int. Cl.
*G06F 1/16* (2006.01)

(52) U.S. Cl.
CPC .......... *G06F 1/1641* (2013.01); *G06F 1/1681* (2013.01)

(58) Field of Classification Search
CPC .... G06F 1/1641; G06F 1/1681; G06F 1/1652; H04M 1/0216; H04M 1/0268; H04M 1/0247
See application file for complete search history.

(56) References Cited

U.S. PATENT DOCUMENTS

| | | | | |
|---|---|---|---|---|
| 8,860,765 B2* | 10/2014 | Kilpatrick, II | ........ | G06F 1/1649 345/1.3 |
| 9,810,406 B2* | 11/2017 | Endo | ...................... | F16M 13/00 |
| 10,170,524 B2* | 1/2019 | Eguchi | .................. | G06F 1/1647 |
| 10,491,724 B2* | 11/2019 | Lin | ...................... | H04M 1/0247 |
| 10,627,868 B2* | 4/2020 | Fujimoto | ................. | G09F 9/30 |
| 10,840,464 B2* | 11/2020 | Hiroki | ..................... | G09F 9/301 |
| 10,909,889 B2* | 2/2021 | Lee | ......................... | G09F 9/301 |
| 10,976,773 B2* | 4/2021 | Park | ..................... | G06F 1/1641 |
| 11,395,421 B2* | 7/2022 | Li | ............................ | G09F 9/301 |
| 11,573,598 B2* | 2/2023 | Chen | .................... | G06F 1/1649 |
| 2010/0064536 A1* | 3/2010 | Caskey | ................. | G06F 1/1694 33/303 |
| 2010/0201604 A1* | 8/2010 | Kee | ....................... | G06F 1/1616 345/1.3 |
| 2011/0241998 A1* | 10/2011 | McKinney | .......... | H04M 1/0247 345/204 |

(Continued)

FOREIGN PATENT DOCUMENTS

| | | |
|---|---|---|
| KR | 10-2008-0035709 A | 4/2008 |
| WO | 2013/080191 A2 | 6/2013 |
| WO | 2020/137288 A1 | 7/2020 |

OTHER PUBLICATIONS

Extended European Search Report dated Oct. 6, 2022 for European Patent Application No. 21218003.8.

*Primary Examiner* — Rockshana D Chowdhury
(74) *Attorney, Agent, or Firm* — Volpe Koenig

(57) ABSTRACT

A foldable screen includes a screen assembly and a housing assembly, the housing assembly includes at least three housings, and the screen assembly covers the at least three housings. The foldable screen includes linked connection assemblies, any two adjacent housings in the at least three housings are connected by the linked connection assemblies, and the at least three housings are unfolded or folded relative to each other at the same time by the linked connection assemblies.

19 Claims, 5 Drawing Sheets

(56) References Cited

U.S. PATENT DOCUMENTS

| | | | |
|---|---|---|---|
| 2015/0062927 A1* | 3/2015 | Hirakata | H01F 1/14708 |
| | | | 362/362 |
| 2016/0273739 A1 | 9/2016 | Endo | |
| 2019/0320048 A1* | 10/2019 | Yang | G06F 1/1652 |
| 2020/0371550 A1* | 11/2020 | Polyakov | G06F 1/1647 |
| 2022/0083102 A1* | 3/2022 | Nishioka | G06F 1/1616 |
| 2022/0163999 A1* | 5/2022 | Perelli | G06F 1/1641 |
| 2022/0294886 A1* | 9/2022 | Seo | H04M 1/0237 |
| 2023/0030559 A1* | 2/2023 | Liu | G06F 1/1681 |

\* cited by examiner

FOLDABLE SCREEN AND ELECTRONIC DEVICE

CROSS REFERENCE TO RELATED APPLICATION

This application is based on and claims priority to Chinese Patent Application No. 202110848755.7, filed on Jul. 27, 2021, the entire content of which is incorporated herein by reference for all purposes.

BACKGROUND

With the development of an electronic device, a foldable form of the electronic device is derived. The electronic device is, for example, a mobile phone, a computer, etc. A foldable electronic device has the same size as a traditional electronic device after being folded so as to be portable, and becomes a tablet computer or a computer with a larger display region after being unfolded. The foldable electronic device has both entertainment and work functions, may be used by a user to browse web pages, watch videos or work and meets demands of consumers pursuing portability and diversified and unified functions at present.

For the electronic device in the foldable form, connection among frames is important and affects the function of the electronic device and the experience of a user.

SUMMARY

The disclosure relates to the technical field of electronic devices, in particular to a foldable screen and an electronic device.

According to a first aspect of an embodiment of the disclosure, a foldable screen is provided. The foldable screen includes a screen assembly and a housing assembly, the housing assembly includes at least three housings, and the screen assembly covers the at least three housings.

The foldable screen includes linked connection assemblies, any two adjacent housings in the at least three housings are connected by the linked connection assemblies, and the at least three housings are unfolded or folded relative to each other at the same time by the linked connection assemblies.

According to a second aspect of an embodiment of the disclosure, an electronic device is provided. The electronic device includes a foldable screen. The foldable screen includes a screen assembly and a housing assembly. The housing assembly includes at least three housings, and the screen assembly covers the at least three housings.

The foldable screen includes linked connection assemblies. Any two adjacent housings in the at least three housings are connected by the linked connection assemblies, and the at least three housings are unfolded or folded relative to each other at the same time by the linked connection assemblies.

It should be understood that the aforementioned general descriptions and detailed descriptions shown hereafter are merely explanatory, and do not limit the disclosure.

BRIEF DESCRIPTION OF THE DRAWINGS

The accompanying drawings, which are incorporated in and constitute a part of this description herein, illustrate examples conforming to the disclosure and together with the description serve to explain principles of the disclosure.

DETAILED DESCRIPTION

Some embodiments will be described in detail herein, examples of which are illustrated in the accompanying drawings. When the following description refers to the accompanying drawings, same numerals in different accompanying drawings represent same or similar elements unless otherwise indicated. The implementation manners described in the following embodiments do not represent all possible implementation manners consistent with the disclosure. On the contrary, they are merely embodiments of an apparatus and a method consistent with some aspects of the disclosure as detailed in the appended claims.

In the related art, a foldable electronic device adopts a semicircular-shaft connection structure to connect different frames together. For the semicircular-shaft connection structure, a screen assembly is relatively small in an extensible range and may be only folded once, and the size of a screen may not be increased infinitely, and thus, the use experience of a user is affected.

The disclosure provides a foldable screen including a screen assembly and a housing assembly, the housing assembly includes at least three housings, and the screen assembly covers the at least three housings. The foldable screen includes linked connection assemblies, any two adjacent housings in the at least three housings are connected by the linked connection assemblies, and the at least three housings are unfolded or folded relative to each other at the same time by the linked connection assemblies, so that the screen area of the screen assembly in an unfolded state is greatly increased to provide a user with a better visual experience.

Figure 1:
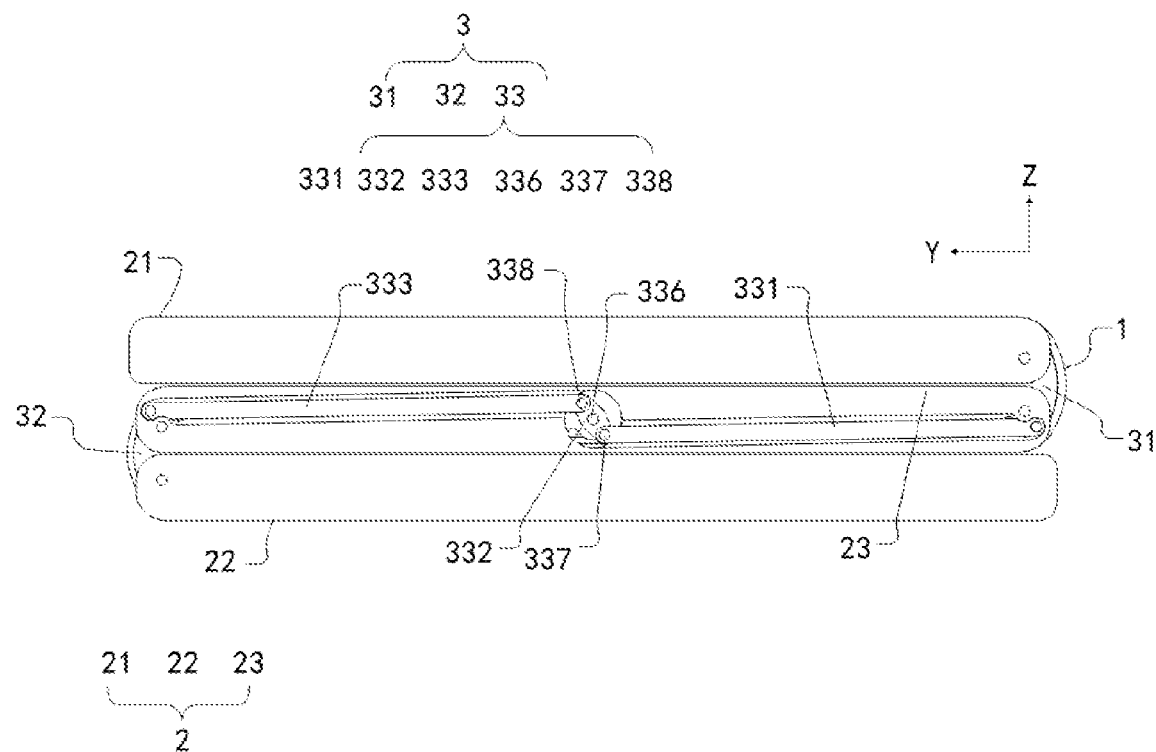
FIG. 1 is a schematic diagram showing a foldable screen in a folded state in accordance with an embodiment.

In an embodiment, as shown in FIG. 1, the embodiment provides a foldable screen including a screen assembly 1 and a housing assembly 2, the housing assembly 2 includes at least three housings, and the screen assembly 1 covers the housing assembly 2. The screen assembly 1 is at least partially made of a flexible display screen which may be bent and folded so that the screen assembly 1 may be in a folded state and an unfolded state. The screen assembly 1 may be an integrated flexible display screen or a splicing and combined screen. For the splicing and combined screen, the screen assembly may be formed by splicing a plurality of flexible display screens for example, or may be formed by splicing a flexible display screen and a panel-type hard screen, for another embodiment.

The foldable screen includes linked connection assemblies 3, any two adjacent housings in the at least three housings are connected by the linked connection assemblies 3, and the at least three housings are unfolded or folded relative to each other at the same time by the linked connection assemblies 3.

No limitation is made to specific structures of the linked connection assemblies 3 in the embodiment, provided that the at least three housings can be unfolded or folded relative to each other at the same time, and therefore, when the foldable display screen is in the unfolded state, the screen area of the screen assembly in the unfolded state is greatly increased to provide a user with better visual experience.

According to an embodiment, as shown in FIG. 1, the embodiment provides a foldable screen including a screen assembly 1 and a housing assembly 2, the housing assembly 2 includes at least three housings, and the screen assembly 1 covers the at least three housings of the housing assembly 2. The foldable screen includes linked connection assemblies 3, any two adjacent housings of the at least three housings are connected by the linked connection assemblies 3, and the at least three housings are unfolded or folded relative to each other at the same time by the linked connection assemblies 3.

The number of the housings included by the housing assembly 2 is an odd number, for example, the number of the housings may be 3, 5, 7 and the like. The at least three housings of the housing assembly 2 forms at least one group of linked housings, and when the housing assembly 2 includes three housings, the three housings form a group of linked housings. When the number of the housings included by the housing assembly 2 is greater than 3, for example, the number of the housings is 5, 7, 9 and the like, the housing assembly 2 includes a plurality of groups of linked housings. In an embodiment, the housing assembly 2 includes a group of linked housings, the group of linked housings include a first housing 21, a second housing 22 and a middle housing 23, and the middle housing 23 is arranged between the first housing 21 and the second housing 22. In other words, based on an orientation shown in FIG. 1, in the three housings, the housing used as the middle housing 23, the housing located above the middle housing 23 and the housing located below the middle housing 23 jointly form a group of linked housings.

Figure 6:
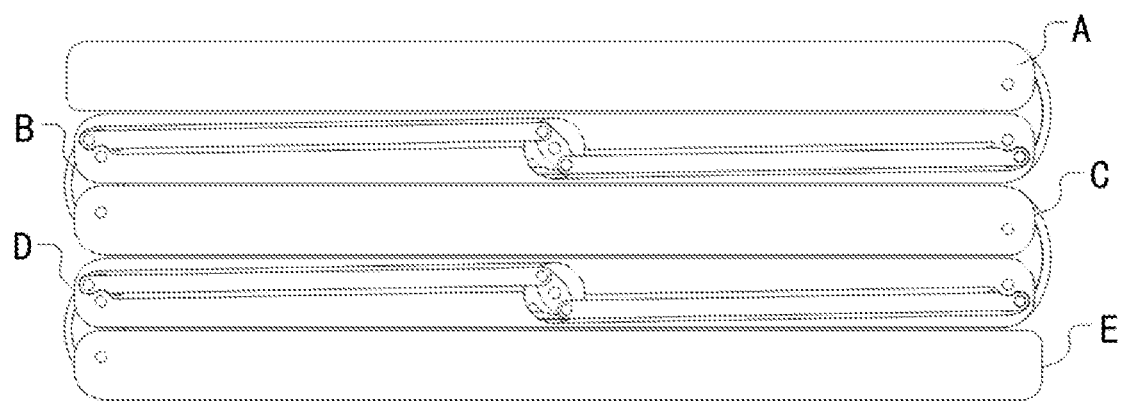
FIG. 6 is a schematic diagram showing a foldable screen in a folded state in accordance with an embodiment.

In another embodiment, as shown in FIG. 6, the housing assembly includes 5 housings which form two groups of linked housings. When the housing assembly comprises a plurality of groups of linked housings, in the plurality of groups of linked housings, a second housing of a first group of the linked housings is a first housing of a second group of linked housings adjacent to the first group of the linked housings. Based on a structure and an orientation shown in FIG. 6, when the foldable screen is in the folded state, the housing assembly in the embodiment includes five housings in total, that is, a housing A, a housing B, a housing C, a housing D and a housing E, from top to bottom. The housing A, the housing B and the housing C form a first group of linked housings, and the housing C, the housing D and the housing E form a second group of linked housings. In combination with FIG. 1 and FIG. 6, in the first group of linked housings, the housing A is used as the first housing 21, the housing B is used as the middle housing 23, and the housing C is used as the second housing 22. In the second group of linked housings, the housing C is used as the first housing 21, the housing D is used as the middle housing 23, and the housing E is used as the second housing 22. The first group of linked housings and the second group of linked housings share the housing C, and the housing C is used as the second housing 22 of the first group of linked housings and is also used as the first housing 21 of the second group of linked housings.

In order to describe an implementation manner of the linked housings and the linked connection assemblies in the embodiment, the embodiment is described with a matching structure of a connection between a group of linked housings and linked connection assemblies as an embodiment. When a plurality of groups of linked housings and linked connection assemblies are arranged, the manners of connection of all the groups of linked housings and linked connection assemblies are the same.

In the embodiment, the foldable screen includes linked connection assemblies 3, a first housing 21, a second housing 22 and a middle housing 23, wherein the first housing 21, the middle housing 23 and the second housing 22 are connected by the linked connection assemblies 3. A central line in a length direction of the screen assembly 1 is a symmetry axis (referring to a Y-axis shown in FIG. 1 and FIG. 3), the foldable screen includes two groups of linked connection assemblies 3, and the two groups of linked connection assemblies 3 are symmetrically arranged on two sides of the symmetry axis, so that the assembling effect and the stability of the housing assembly 2 are improved.

The linked connection assemblies 3 includes a first connection part 31, an adjusting connection part 33 and a second connection part 32. The first housing 21 is rotatably connected with the middle housing 23 by the first connection part 31, and the second housing 22 is rotatably connected with the middle housing 23 by the second connection part 32. The first connection part 31 is rotatably connected with the first housing 21, the second connection part 32 is rotatably connected with the second housing 22, the adjusting connection part 33 is connected with the middle housing 23, and the adjusting connection part 33 is connected with the first connection part 31 and the second connection part 32 respectively.

In an embodiment, a group of linked housings is arranged, the linked housings include one middle housing 23, the first housing 21 is rotatably connected with the middle housing 23 by the first connection part 31, the middle housing 23 is rotatably connected with the second housing 22 by the second connection part 32, and then, a three-section effect of the housing assembly 2 is formed, so that the screen assembly 1 has a three-section foldable form.

In another embodiment, as shown in FIG. 6, the housing B and the housing D are used as the middle housing 23, the housing A is rotatably connected with the housing B by the first connection part, the housing B is connected with the housing C by the second connection part, the housing C is connected with the housing D by the first connection part, and the housing D is connected with the housing E by the second connection part. The respective housings are connected by the first connection part and the second connection part, so that linkage among the respective housings is achieved. When the housing A or the housing E in the housing assembly 2 is folded by a user, the linked connection assemblies act at the same time, and the respective housings are folded or unfolded at the same time, so that rapid unfolding or folding is achieved, and the user experience is improved.

In an embodiment, the screen assembly includes an integrated flexible screen, that is, the overall screen assembly is integral. As shown in FIG. 1, the foldable screen is in the folded state, a first region, corresponding to the first connection part on the integrated flexible screen, is on an outer side of the first connection part, that is, the first region, corresponding to the first connection part on the integrated flexible screen is in an outwards bending state. A second region, corresponding to the second connection part, on the integrated flexible screen is on an inner side of the second connection part, that is, the second region, corresponding to the second connection part, on the integrated flexible screen is in an inwards bending state. In the embodiment, in addition to a surrounding manner of the screen assembly shown in FIG. 2, a setting manner may also be adopted as follows: based on the orientation shown in FIG. 1, the screen assembly is arranged on a lower surface of the housing below the middle housing 23 and then successively covers the housing assembly, which may be understood as the structure shown in FIG. 2 being upside down when the middle housing 23 is connected with the housing below the middle housing 23 by the first connection part, and the middle housing 23 is connected with the housing above the middle housing 23 by the second connection part.

In another embodiment, the screen assembly includes a splicing screen assembly, and the splicing screen assembly includes a panel-type screen and a bendable flexible screen. The panel-type screen is a non-flexible screen, that is, a hard screen which may not be bent and folded, and the bendable flexible screen is a flexible screen which may be bent and folded. In the embodiment, when the foldable screen is in the unfolded state, the first connection part is spaced from the second connection part, the panel-type screen that is located between the first connection part and the second connection part, for example, may be arranged on an upper side of the first housing 21 shown in FIG. 2, or a lower side of the second housing 22 to be used as an auxiliary screen, so that a user can look up information or time at ordinary times conveniently when using an electronic device.

When the foldable screen is in the folded state, a first region, corresponding to the first connection part on the bendable flexible screen, is located on the outer side of the first connection part, and a second region, corresponding to the second connection part on the bendable flexible screen is located on the inner side of the second connection part. For example, the panel-type screen is arranged on the upper side of the first housing 21 shown in FIG. 2, the bendable flexible screens is arranged on each of the rest positions where screens are required to be arranged, and the panel-type screen and the bendable flexible screen are spliced with or without seams. When a user needs to use an electronic device to watch a view screen or in other application scenarios in which the area of the screen is required to be increased, the foldable screen is unfolded, the panel-type screen and the bendable flexible screen perform displaying jointly, or the bendable flexible screen performs displaying alone, thus more selectable display manners are provided for the user, so that the user experience is improved.

Of course, it may be understood that the splicing screen assembly may include a plurality of flexible screens, may also include a plurality of non-flexible screens or include a plurality of flexible screens and a plurality of non-flexible screens, depending on actual design.

Figure 3:
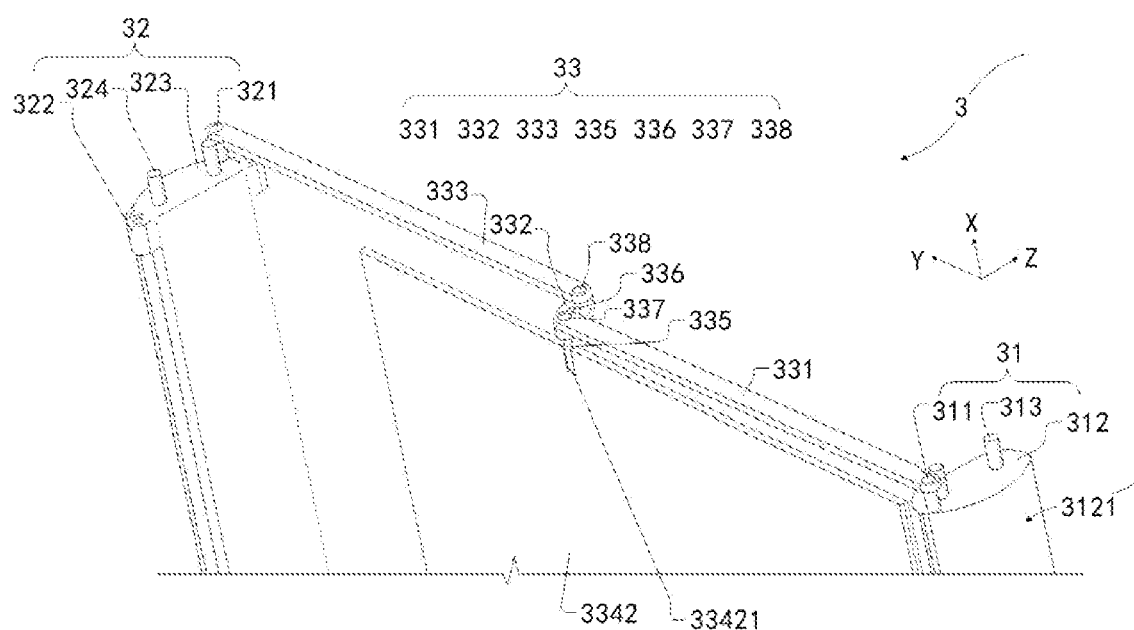
FIG. 3 is a schematic diagram showing a linked connection assembly shown in accordance with an embodiment.

In an embodiment, as shown in FIG. 1 and FIG. 3, one end of the adjusting connection part 33 of the linked connection assemblies 3 is rotatably connected with the first connection part 31, the other end of the adjusting connection part 33 is rotatably connected with the second connection part 32, and a distance between one end of the adjusting connection part and the other end of the adjusting connection part 33 is adjustable.

The adjusting connection part 33 is arranged on the middle housing 23 and is connected with the middle housing 23. One end of the adjusting connection part 33 is correspondingly connected with the first connection part 31, the other end of the adjusting connection part 33 is correspondingly connected with the second connection part 32, and thus, linked connection is achieved. When the screen assembly 1 is unfolded or folded by a user, linkage among the first housing 21, the second housing 22 and the middle housing 23 is achieved by the first connection part 31, the adjusting connection part 33 and the second connection part 32, so that problems such as folds and deformation caused by pulling in a folding process of the screen assembly 1 are solved, the extension range of the screen assembly 1 is widened, the stability of the foldable screen is improved, and the influence on the normal use of the foldable screen is avoided.

In the embodiment, as shown in FIG. 1 and FIG. 3, the adjusting connection part 33 includes a first adjusting member 331, a rotary adjusting member 332 and a second adjusting member 333, a first end of the first adjusting member 331 is rotatably connected with the first connection part 31, and a second end of the first adjusting member 331 is rotatably connected with the rotary adjusting member 332. A second end of the second adjusting member 333 is rotatably connected with the rotary adjusting member 332, and a first end of the second adjusting member 333 is rotatably connected with the second connection part 32.

Each of the first adjusting member 331 and the second adjusting member 333 is of a long rod structure, and the rotary adjusting member 332 is of a short rod structure. The first connection part 31 includes a first pin 311, the second connection part 32 includes a second pin 321, the first end of the first adjusting member 331 is hinged with the first pin 311, the second end of the first adjusting member 331 is hinged with the rotary adjusting member 332 by a connecting pin, the second end of the second adjusting member 333 is further hinged with the rotary adjusting member 332 by a connecting pin, and the first end of the second adjusting member 333 is hinged with the second pin 321.

In the embodiment, the rotary adjusting member 332 is configured to rotate around a central shaft 336 of the rotary adjusting member 332, the rotary adjusting member 332 includes a first rotating shaft 337 and a second rotating shaft 338, the first rotating shaft 337 is rotatably connected with the second end of the first adjusting member 331, and the second rotating shaft 338 is rotatably connected with the second end of the second adjusting member 333. When the foldable screen is in the folded state, the rotary adjusting member 332 rotates to a first position around the central shaft 336. When the foldable screen is in the unfolded state, the rotary adjusting member 332 rotates to a second position around the central shaft 336. A distance between the first end of the first adjusting member and the first end of the second adjusting member when the rotary adjusting member rotates to the first position, is different from a distance between the first end of the first adjusting member and the first end of the second adjusting member when the rotary adjusting member rotates to the second position.

Figure 4:
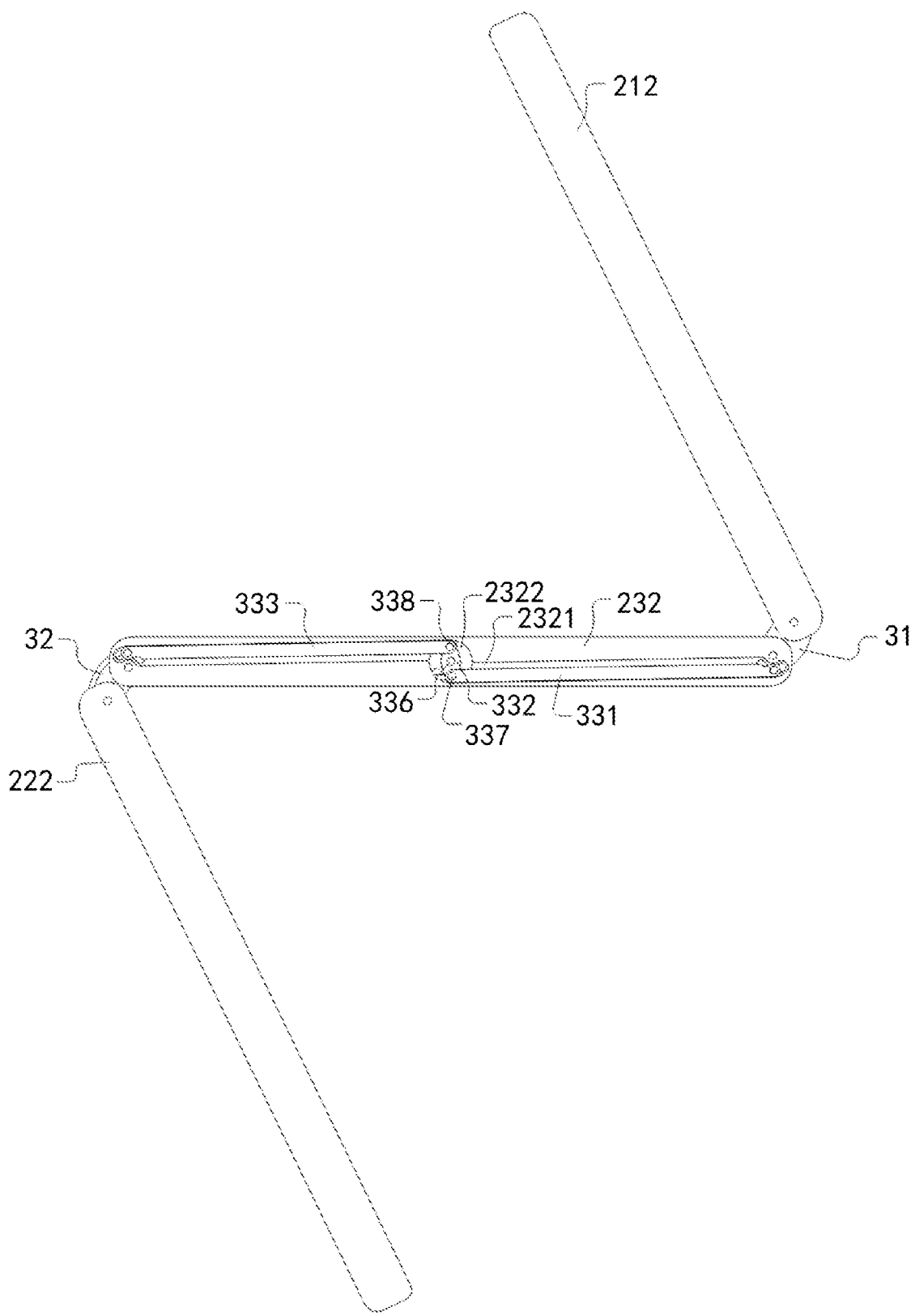
FIG. 4 is a schematic diagram showing a foldable screen in a semi-unfolded state in accordance with an embodiment.

With additional reference to FIG. 4, in order to mount the adjusting connection part, in the embodiment, the middle housing is provided with a mounting hole 2322 and a mounting slot 2321, and the mounting hole 2322 is interconnected with the mounting slot 2321. The rotary adjusting member 332 is mounted in the mounting hole 2322, and the first adjusting member 331 and the second adjusting member 333 are mounted in the mounting slot 2321; and recessed parts are respectively arranged on the first end of the first adjusting member 331 and the first end of the second adjusting member 333. The recessed parts are used for avoidance of first mounting pins or second mounting pins (which will be introduced in detail hereafter).

For the foldable screen in the embodiment, when the screen assembly 1 is folded or unfolded, the rotary adjusting member 332 can rotate around the central shaft 336 with the movement of the first adjusting member 331 and the second adjusting member 333 so as to adjust the distance between the first end of the first adjusting member 331 and the first end of the second adjusting member 333.

Figure 2:
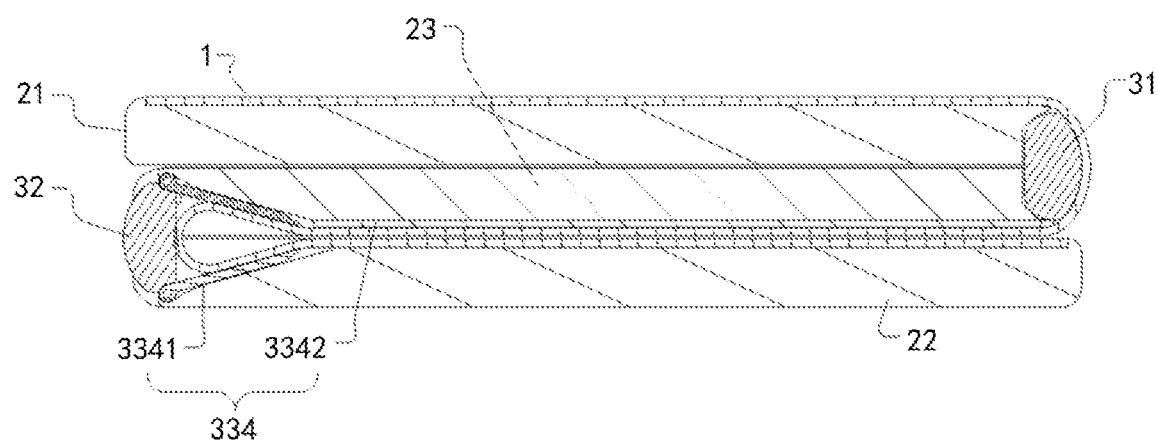
FIG. 2 is a schematic diagram showing a cross section of a foldable screen in a folded state in accordance with an embodiment.

In an embodiment, as shown in FIG. 1 to FIG. 3, the foldable screen in the embodiment has all technical characteristics in the aforementioned embodiments, and meanwhile, the adjusting connection part 33 of the foldable screen in the embodiment includes a first adjusting member 331, a rotary adjusting member 332, a second adjusting member 333 and a supporting part 334. Specific structures and connection manners of the first adjusting member 331, the rotary adjusting member 332 and the second adjusting member 333 have been specifically described in the aforementioned embodiments and will not be repeated again herein.

Referring to FIG. 2, the supporting part 334 is configured to support the screen assembly 1, the supporting part 334 includes a fixed supporting part 3341 and a movable supporting part 3342, the fixed supporting part 3341 is connected with the second connection part 32, the movable supporting part 3342 is connected with the rotary adjusting member 332, and the movable supporting part 3342 moves in a length direction (referring to an Y-axis direction shown in FIG. 3) of the middle housing 23 with the rotation of the rotary adjusting member 332. Of course, it may be understood that the fixed supporting part 3341 may also be fixedly connected with the first connection part 31, and the movable supporting part 3342 may be connected with the rotary adjusting member 332.

In the embodiment, referring to FIG. 2, the movable supporting part 3342 is of a plate-like structure, is arranged between the middle housing 23 and the screen assembly 1 and is connected with the screen assembly 1. A third region, corresponding to the movable supporting part 3342, of the screen assembly 1 is a straight region and has no folded state whether the screen assembly is folded or unfolded, so that the screen assembly 1 may be completely attached to the movable supporting part 3342 to avoid generating folds or other situations. Since the screen assembly is changed from the folded state to the unfolded state, the area of the third region may be increased. By arranging the movable supporting part 3342 so as to be capable of moving relative to the middle housing 23, support may be provided for the screen assembly 1 in both the folded state and the unfolded state. Due to the linkage among the first adjusting member 331, the rotary adjusting member 332 and the second adjusting member 333, the movable supporting part 3342 can move with the rotation of the rotary adjusting member 332, the movable supporting part 3342 drives the screen assembly 1 to move in a length direction of the middle housing 23, so that the problems such as folds and deformation caused by pulling in the folding process of the screen assembly 1 are solved, the screen assembly 1 is protected, and the damage ratio is reduced.

Referring to FIG. 2 and FIG. 3, the movable supporting part 3342 is provided with a limiting slot 33421, the adjusting connection part 33 includes a limiting part 335 which is of a columnar structure, the limiting part 335 is fixedly connected with the rotary adjusting member 332, and the limiting part 335 is inserted into the limiting slot 33421 to achieve limitation between the movable supporting part 3342 and the adjusting connection part 33. This ensures that the movable supporting part 3342 is capable of moving in the length direction of the middle housing 23 with the rotation of the rotary adjusting member 332. The limiting slot 33421 is capable of penetrating through the movable supporting part 3342 in a thickness direction (referring to a Z-axis shown in FIG. 3) of the movable supporting part 3342, so that the effect of connection between the limiting part 335 and the limiting slot 33421 is improved. Alternatively, the limiting slot 33421 may also be a blind hole and is formed in the thickness direction of the movable supporting part 3342, so that the limiting part 335 is incapable of penetrating out of the limiting slot 33421, thus it is ensured that the limiting part 335 may not abut against the screen assembly 1, and the screen assembly 1 is prevented from being damaged.

Figure 5:
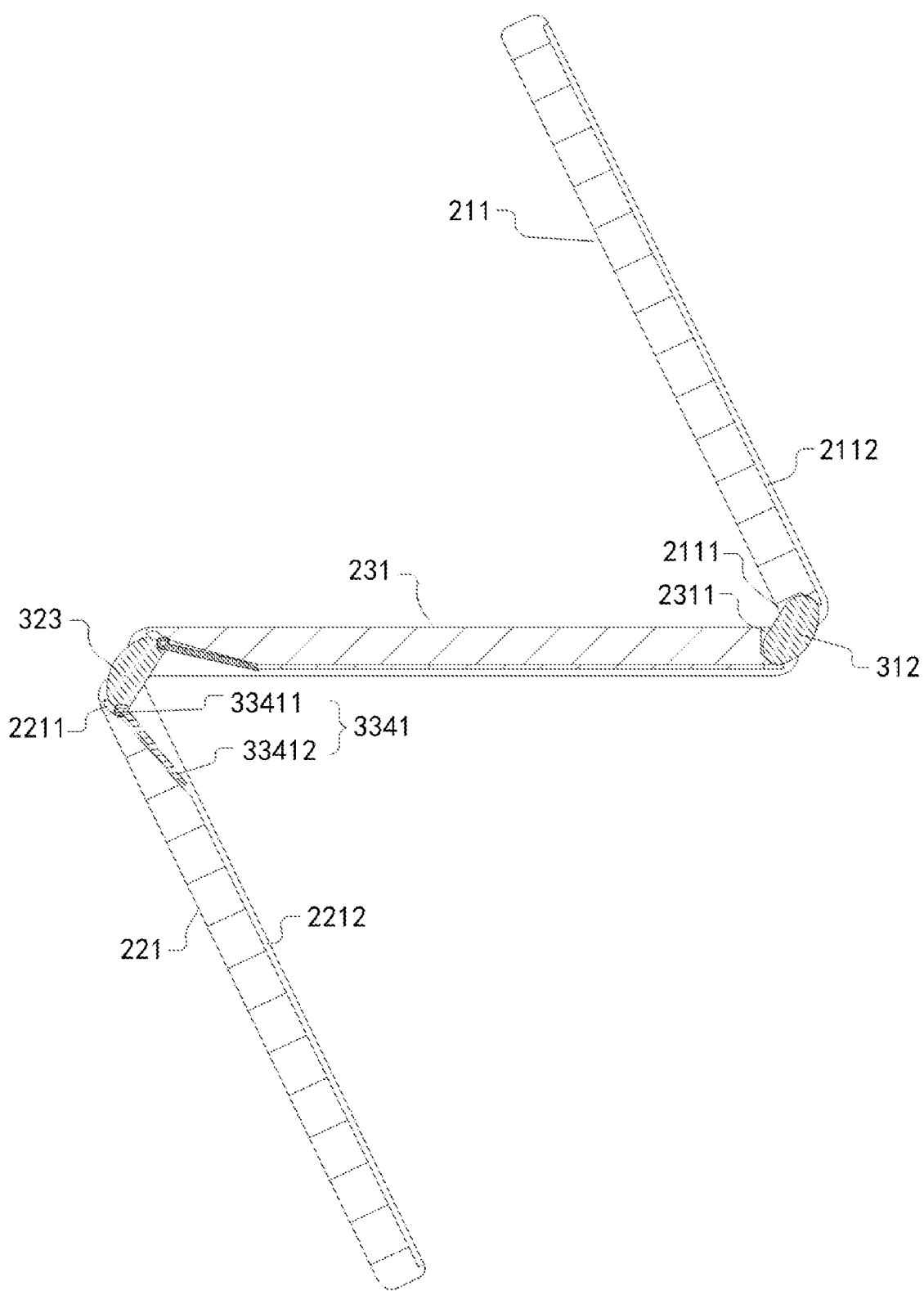
FIG. 5 is a schematic diagram showing a cross section of a foldable screen in a semi-unfolded state in accordance with an embodiment.

In the embodiment, referring to FIG. 2 and FIG. 5, the fixed supporting part 3341 includes two supporting bodies, each of the supporting bodies includes a connection end 33411 and a free end 33412, the connection end 33411 is of an annular structure, the free end 33412 is of a rod-like structure, and the two supporting bodies are arranged on two sides of the second connection part 32. The connection ends 33411 of the two supporting bodies are mounted on the second connection part 32 and are hinged with the second connection part 32, and the free ends 33412 of the two supporting bodies respectively extend into the middle housing 23 and the second housing 22 which are connected with the second connection part 32.

The housing assembly 2 further includes a mounting space (not shown in figures) which is arranged on the middle housing 23 and the second housing 22 which are connected with the second connection part 32, and the free ends 33412 of the supporting bodies extend into the mounting space. The mounting space plays a role in limiting the supporting bodies and limits the movement directions of the free ends 33412 of the supporting bodies to prevent the supporting bodies from deviation, thereby ensuring the supporting effect of the supporting bodies to the screen assembly 1.

The second connection part 32 includes two connection lugs 322 in one-to-one correspondence with the two supporting bodies, and the connection ends 33411 of the supporting bodies are rotatably connected with the connection lugs 322 by shaft levers.

The second region, located at the second connection part 32, of the screen assembly 1 is in the in-folding state, so that the problem of folds occurs in the second region of the screen assembly 1. The adjusting connection part 33 is capable of driving the movable supporting part 3342 to move to further drive the screen assembly 1 to move relative to the middle housing 23, so that the screen assembly 1 has a certain movement relative to the middle housing 23 in the length direction (referring to the Y-axis shown in FIG. 1 and FIG. 3) of the screen assembly 1, whereby limitation and pulling to the screen assembly 1 by the middle housing 23, the first connection part 31 and the second connection part 32 is reduced, and the stress generated when the screen assembly 1 is folded is dispersed to avoid the phenomenon of the folds of the screen assembly 1, and the two supporting bodies assist in supporting the screen assembly 1, thereby doubly ensuring that the screen assembly 1 does not have folds.

In an embodiment, as shown in FIG. 1 and FIG. 3, the first connection part 31 includes a first connection rotating shaft 312 and the first pin 311 arranged on the first connection rotating shaft 312, the first connection rotating shaft 312 extends in a width direction of the screen assembly 1, the first pin 311 is fixedly connected with an end of the first connection rotating shaft 312 and extends in the same direction with the first connection rotating shaft 312, the adjusting connection part 33 is rotatably connected with the first pin 311, and thus, the connection between the adjusting connection part 33 and the first connection rotating shaft 312 is achieved.

The first connection rotating shaft 312 is located between the first housing 21 and the middle housing 23, and the first housing 21 is rotatably connected with the middle housing 23 by the first connection rotating shaft 312.

In an embodiment, lantern rings (not shown in figures) are respectively arranged on one side of the middle housing 23 and one side of the first housing 21, the middle housing 23 and the first housing 21 both sleeve the first connection rotating shaft 312 via the lantern rings, so that the middle housing 23 and the first housing 21 are both capable of rotating on the first connection rotating shaft 312, and the stability of the housing assembly 2 is improved.

In another embodiment, the first connection part 31 further includes first mounting pins 313 arranged on the end of the first connection rotating shaft. The first mounting pins are fixedly connected with the first connection rotating shaft, and the first housing and the middle housing are rotatably connected with the first connection rotating shaft by the first mounting pins respectively. In the embodiment, two first mounting pins 313 are provided, one of the two first mounting pins 313 is rotatably connected with the first housing 21, and the other one of the two first mounting pins 313 is rotatably connected with the middle housing 23. In other possible embodiments, there may be one first mounting pin 313, the first housing 21 and the middle housing 23 may sleeve the first mounting pin 313 at the same time and may be rotatably connected with the first mounting pin 313, so that the overall structure of the housing assembly 2 is more compact. In the embodiment, the first connection rotating shaft includes an arc-shaped side wall 3121, and in the folded state, the first region, that is, an everted bent part, of the screen assembly covers the arc-shaped side wall 3121.

In an embodiment, as shown in FIG. 1 and FIG. 3, the second connection part 32 includes a second connection rotating shaft 323, the second pin 321 and the two connection lugs 322. The second connection rotating shaft 323 extends in the width direction (referring to the X-axis shown in FIG. 3) of the screen assembly 1, the second pin 321 is fixedly connected with an end of the second connection rotating shaft 323 and extends in the same direction with the second connection rotating shaft 323, the adjusting connection part 33 sleeves the second pin 321, and thus, the connection between the adjusting connection part 33 and the second connection rotating shaft 323 is achieved. When the foldable screen is in the unfolded state, the two connection lugs 322 are arranged on two sides of the second connection rotating shaft 323 in the length direction of the screen assembly 1 and protrude from the second connection rotating shaft 323, so that the connection ends 33411 of the supporting bodies are capable of sleeving the connection lugs 322.

The second connection rotating shaft 323 is located between the second housing 22 and the middle housing 23, and the second housing 22 is rotatably connected with the middle housing 23 by the second connection rotating shaft 323. In an embodiment, lantern rings (not shown in figures) are respectively arranged on the other side of the middle housing 23 and one side of the second housing 22, the middle housing 23 and the second housing 22 both sleeve the second connection rotating shaft 323 via the lantern rings, so that the middle housing 23 and the second housing 22 are both capable of rotating on the second connection rotating shaft 323, and the stability of the housing assembly 2 is improved.

In another embodiment, the second connection part 32 further includes second mounting pins 324 arranged on the second connection rotating shaft 323. The second mounting pins are fixedly connected with the second connection rotating shaft, and the second housing and the middle housing are rotatably connected with the second connection rotating shaft by the second mounting pins respectively. In the embodiment, two second mounting pins 324 are provided, one of the two second mounting pins 324 is rotatably connected with the second housing 22, and the other one of the two second mounting pins 324 is rotatably connected with the middle housing 23. In other possible embodiments, there may be one second mounting pin 324, the second housing 22 and the middle housing 23 may sleeve the second mounting pin 324 at the same time and may be rotatably connected with the second mounting pin 324, so that the overall structure of the housing assembly 2 is more compact. In the embodiment, the second connection rotating shaft 323 includes a mounting plane, and in the folded state, a bent surface, that is, the in-folding second region, of the screen assembly 1 is in contact connection with the mounting plane.

In an embodiment, as shown in FIG. 1, FIG. 4 and FIG. 5, the first housing 21 includes a first body 211 and a first frame 212, the first frame 212 is of a U-shaped structure and is arranged in a circumferential direction of the first body 211 to avoid a side connected with the middle housing 23, and the first frame 212 is capable of surrounding the first body 211 so as to protect the first body 211.

The first body 211 is fixedly connected with the first frame 212, an end of the first frame 212 sleeves one of the first mounting pins 313 of the first connection part 31, and the first body 211 is hinged with the first mounting pin 313 by the first frame 212. A first avoidance groove 2111 is formed in the first body 211, and the first avoidance groove 2111 is adjacent to the first connection rotating shaft 312. When the foldable screen is folded or unfolded, no interference is present between the first body 211 and the first connection rotating shaft 312, so that a smooth bending or unfolding action is ensured.

When the foldable screen is in the folded state, a first mounting groove 2112 is formed in a side, away from the middle housing 23, of the first body 211, and a partial region of the screen assembly 1 is accommodated in the first mounting groove 2112, so that connection between the screen assembly 1 and the first housing 21 is more reliable. In a mounting state, a surface of the screen assembly 1 is flush with a surface of the first frame 212 to avoid the phenomenon that the edge of the screen assembly 1 is scratched to affect the service life of the screen assembly 1.

A mounting groove (not shown in figures) of the housing assembly 2 is formed in the first body 211, so that the free ends 33412 of the supporting bodies extend into the mounting groove; and the mounting groove is arranged to communicate with the first mounting groove 2112, so that the supporting bodies may be connected with the screen assembly 1 and support the screen assembly 1.

In the embodiment, as shown in FIG. 1, FIG. 4 and FIG. 5, the middle housing 23 includes a middle body 231 and two middle frames 232, the two middle frames 232 are symmetrically arranged on two sides of the middle body 231 along the symmetry axis, the middle frames 232 are of long-plate structures and cover the outside of the middle body 231 to avoid the exposure of the middle body 231, thereby protecting the middle body 231.

The middle body 231 is fixedly connected with the two middle frames 232, two ends of the two middle frames 232 respectively sleeve the other first mounting pin 313 of the first connection part 31, and the second mounting pin 324 of the second connection part 32, and the middle body 231 is hinged with the first mounting pin 313 and the second mounting pin 324 by the middle frames 232. Two middle avoidance grooves 2311 are formed in the middle body 231, and the two middle avoidance grooves 2311 are adjacent to the first connection rotating shaft 312 and the second connection rotating shaft 323 respectively so as to avoid the first connection rotating shaft 312 and the second connection rotating shaft 323. When the foldable screen is folded or unfolded, no interference is present between the middle body 231 and each of the first connection rotating shaft 312 and the second connection rotating shaft 323, so that a trouble-free bending or unfolding action is ensured.

The adjusting connection part 33 is mounted on the middle frames 232. The mounting hole 2322 and the mounting slot 2321 are formed in the middle frames 232, and the sectional area of the mounting slot 2321 is greater than that of the adjusting connection part 33, so that the adjusting connection part 33 is capable of moving in the mounting slot 2321. The mounting hole 2322 for the rotary adjusting member 332 of the adjusting connection part 33 is circular, so that the rotary adjusting member 332 is capable of rotating in the circumferential direction itself, and the limiting part 335 of the adjusting connection part 33 penetrates through the mounting slot 2321 to be spliced with the limiting slot 33421 of the movable supporting part 3342.

The middle body 231 is further provided with a mounting groove (not shown in figures) of the housing assembly 2, so that the free ends 33412 of the supporting bodies extend into the mounting groove; and the mounting groove is exposed out of the surface of the middle body 231, so that the supporting bodies may be connected with the screen assembly 1 and supports the screen assembly 1.

In the embodiment, as shown in FIG. 1, FIG. 4 and FIG. 5, the second housing 22 includes a second body 221 and a second frame 222, the second frame 222 is of a U-shaped structure and is arranged in a circumferential direction of the second body 221 to avoid a side connected with the middle housing 23, and the second frame 222 is capable of surrounding the second body 221 so as to protect the second body 221.

The second body 221 is fixedly connected with the second frame 222, an end of the second frame 222 sleeves the other second mounting pin 324 of the second connection part 32, and the second body 221 is hinged with the second mounting pin 324 by the second frame 222. A second avoidance groove 2211 is formed in the second body 221, and the second avoidance groove 2211 is adjacent to the second connection rotating shaft 323. When the foldable screen is folded or unfolded, no interference is present between the second body 221 and the second connection rotating shaft 323, so that a smooth bending or unfolding action is ensured.

When the foldable screen is in the folded state, a second mounting groove 2212 is formed in a side, away from the middle housing 23 or a side close to the middle housing 23, of the second body 221. The position of the second mounting groove 2212 depends on the number of the middle housing 23, and the specific position of the second mounting groove 2212 is based on an actual design. A partial region of the screen assembly 1 is accommodated in the second mounting groove 2212, so that connection between the screen assembly 1 and the second housing 22 is more reliable. In a mounting state, the surface of the screen assembly 1 is flush with the surface of the second frame 222 to avoid the phenomenon that the edge of the screen assembly 1 is scratched to affect the service life of the screen assembly 1.

A mounting groove (not shown in figures) of the housing assembly 2 may be formed in the second body 221, and specifically, whether the mounting groove is formed in the second body 221 is determined according to the number of the middle housing 23. The free ends 33412 of the supporting bodies extend into the mounting groove, and the mounting groove communicates with the second mounting groove 2212, so that the supporting bodies may be connected with the screen assembly 1 and supports the screen assembly 1.

Herein, it should be noted that the edge of the end of the first frame 212, the edge of the end of the middle frame 232 and the edge of the end of the second frame 222 are all chamfered, thereby avoiding interference between the first housing 21, the middle housing 23 and the second housing 22 when the foldable screen is folded or unfolded.

In the embodiment, the housing assembly 2 further includes meshing parts (not shown in figures) which are arranged on ends of the first housing 21, the middle housing 23 and the second housing 22. When the foldable screen is in the unfolded state, the first housing 21 and the middle housing 23, the second housing 22 and the middle housing 23, and any two adjacent middle housings 23 are in engaged connection by the meshing parts. Under the engaged action of the meshing parts of the housing assembly, the synchronous rotation of the first housing, the middle housing and the second housing is achieved, and the synchronous linkage of the overall foldable screen is achieved, so that the stability of an electronic device in folding is improved, the use demand of a user is met, and the user experience is improved.

In an embodiment, a first meshing part is arranged on an end of the first frame 212 of the first housing 21, middle meshing parts are arranged on edges of two ends of the middle frame 232, a second meshing part is arranged on an end of the second frame 222 of the second housing 22, and the middle frame 232 of the middle housing 23 is in engaged connection with the first meshing part by one of the middle meshing parts and is in engaged connection with the second meshing part by the other middle meshing part of the middle housing 23. In a folding or unfolding process, the first meshing part, the middle meshing parts and the second meshing part of the housing assembly 2 restrict mutually to avoid deviation when the first housing 21, the middle housing 23 and the second housing 22 rotate, thereby ensuring that the foldable screen is normally folded or unfolded.

The disclosure further provides an electronic device, which may be an electronic device with a foldable screen, such as a mobile phone, a tablet computer, etc. The electronic device includes the foldable screen in the embodiments disclosed above.

The foldable screen in the disclosure is simple and reliable in structure and low in production and processing difficulty. By arranging the linked connection assemblies, linkage among all the housings of the housing assembly is achieved, a display screen is rapidly unfolded and folded, meanwhile, the problems of folds and deformation caused by pulling in a screen folding process can also be solved, support is provided for further increasing the display area after the display screen is unfolded, and therefore, the foldable screen is applicable to various application scenarios.

Each of the first housing, the middle housing and the second housing of the housing assembly is of a housing structure of the electronic device and is used for mounting the screen assembly and the linked connection assemblies to achieve a multi-folding effect of the screen assembly, the size of the screen assembly may be increased infinitely, the problem that the screen assembly is small is solved, and the user experience is improved. The first housing, the middle housing, the second housing and the like in the disclosure are only named for facilitating description in a description process, but have no specific actual meaning.

The first adjusting member and the second adjusting member of the adjusting connection part are connected with the first connection part and the second connection part respectively. When the foldable screen is in the folded or unfolded state, the first adjusting member and the second adjusting member move synchronously with the rotary adjusting member, so that the limiting part on the rotary adjusting member moves therewith, the limiting part is in matched connection with the limiting slot of the movable supporting part, the movable supporting part is linked with the adjusting connection part, and furthermore, the movable supporting part is driven to move in the length direction of the middle housing. The movable supporting part moves synchronously under the action of the rotary adjusting member, so that the displacement change of the screen assembly in a folding process is achieved.

Those skilled in the art will easily figure out other implementation solutions of the disclosure after considering the specification and practicing the disclosure disclosed herein. The disclosure intends to cover any modification, application or adaptive change of the disclosure, which conform to a general principle of the disclosure and include common general knowledge or conventional technical means not disclosed herein in the technical field.

It should be understood that the disclosure is not limited to the above accurate structure described above and shown in the drawings and allows various modifications and changes without departing from its scope. The scope of the disclosure is limited by the appended claims.

What is claimed is:

1. A foldable screen, comprising a screen assembly and a housing assembly, the housing assembly comprising at least three housings, and the screen assembly covering the at least three housings; wherein
the foldable screen comprises linked connection assemblies, any two adjacent housings in the at least three housings are connected by the linked connection assemblies, and the at least three housings are unfolded or folded relative to each other at the same time by the linked connection assemblies;
the at last three housings form at least one group of linked housings, comprising a first housing, a middle housing and a second housing which are connected with each other; and
the linked connection assemblies comprise a first connection part, an adjusting connection part and a second connection part, the first housing is rotatably connected with the middle housing by the first connection part, and the second housing is rotatably connected with the middle housing by the second connection part, the adjusting connection part is connected with the middle housing, and the adjusting connection part is connected with the first connection part and the second connection part respectively.

2. The foldable screen according to claim 1, wherein a second housing of a first group of the at least one group of linked housings is a first housing of a second group of the linked housings adjacent to the first group of the linked housings.

3. The foldable screen according to claim 1, wherein the screen assembly comprises an integrated flexible screen; or the screen assembly comprises a splicing screen assembly, and the splicing screen assembly comprises a non-flexible screen and a flexible screen, or a plurality of flexible screens, or a plurality of non-flexible screens.

4. The foldable screen according to claim 3, wherein when the foldable screen is in an unfolded state, the first connection part is spaced from the second connection part, and the non-flexible screen is located between the first connection part and the second connection part; and
when the foldable screen is in a folded state, a first region, corresponding to the first connection part, on the integrated flexible screen or the flexible screen of the splicing screen assembly is on an outer side of the first connection part, and a second region, corresponding to the second connection part, on the integrated flexible screen or the flexible screen is on an inner side of the second connection part.

5. The foldable screen according to claim 1, wherein one end of the adjusting connection part is connected with the first connection part, the other end of the adjusting connection part is connected with the second connection part, and a distance between one end of the adjusting connection part and the other end of the adjusting connection part is adjustable.

6. The foldable screen according to claim 5, wherein the adjusting connection part comprises a first adjusting member, a rotary adjusting member and a second adjusting member, a first end of the first adjusting member is rotatably connected with the first connection part, and a second end of the first adjusting member is rotatably connected with the rotary adjusting member; and
a first end of the second adjusting member is rotatably connected with the second connection part, and a second end of the second adjusting member is rotatably connected with the rotary adjusting member.

7. The foldable screen according to claim 6, wherein the rotary adjusting member is configured to rotate around a central shaft of the rotary adjusting member, the rotary adjusting member comprises a first rotating shaft and a second rotating shaft, the first rotating shaft is rotatably connected with the second end of the first adjusting member, and the second rotating shaft is rotatably connected with the second end of the second adjusting member;
when the foldable screen is in the folded state, the rotary adjusting member rotates to a first position around the central shaft of the rotary adjusting member;
when the foldable screen is in the unfolded state, the rotary adjusting member rotates to a second position around the central shaft of the rotary adjusting member; and
a distance between the first end of the first adjusting member and the first end of the second adjusting member when the rotary adjusting member rotates to the first position is different from a distance between the first end of the first adjusting member and the first end of the second adjusting member when the rotary adjusting member rotates to the second position.

8. The foldable screen according to claim 7, wherein the middle housing is provided with a mounting hole and a mounting slot, and the mounting hole is interconnected with the mounting slot;
the rotary adjusting member is mounted in the mounting hole, and the first adjusting member and the second adjusting member are mounted in the mounting slot; and recessed parts are respectively arranged on the first end of the first adjusting member and the first end of the second adjusting member.

9. The foldable screen according to claim 1, wherein the adjusting connection part comprises a supporting part, the supporting part is configured to support the screen assembly, the supporting part comprises a fixed supporting part and a movable supporting part, the fixed supporting part is connected with the second connection part or the first connection part, and the movable supporting part is connected with the rotary adjusting member.

10. The foldable screen according to claim 9, wherein the movable supporting part is provided with a limiting slot, the adjusting connection part comprises a limiting part, the limiting part is fixedly connected with the rotary adjusting member, and the limiting part is inserted into the limiting slot.

11. The foldable screen according to claim 9, wherein the fixed supporting part comprises two supporting bodies, the two supporting bodies are arranged on two sides of the second connection part, connection ends of the two supporting bodies are hinged with the second connection part, and free ends of the two supporting bodies respectively extend into the middle housing and the second housing.

12. The foldable screen according to claim 1, wherein the first connection part comprises a first connection rotating shaft, and the first housing is rotatably connected with the middle housing by the first connection rotating shaft; and
the first connection rotating shaft comprises an arc-shaped side wall, and the screen assembly covers on the arc-shaped side wall.

13. The foldable screen according to claim 12, wherein the first connection part comprises first mounting pins arranged on ends of the first connection rotating shaft, and the first mounting pins are fixedly connected with the first connection rotating shaft;
the first housing and the middle housing are rotatably connected with the first connection rotating shaft by the first mounting pins respectively.

14. The foldable screen according to claim 1, wherein the second connection part comprises a second connection rotating shaft, and the second housing is rotatably connected with the middle housing by the second connection rotating shaft; and
the second connection rotating shaft comprises a mounting plane, and a bent surface of the screen assembly is in contact connection with the mounting plane.

15. The foldable screen according to claim 14, wherein the second connection part comprises second mounting pins arranged on ends of the second connection rotating shaft, and the second mounting pins are fixedly connected with the second connection rotating shaft;
the second housing and the middle housing are rotatably connected with the second connection rotating shaft by the second mounting pins respectively.

16. The foldable screen according to claim 1, wherein meshing parts are arranged on ends of the first housing and the middle housing; and
when the foldable screen is in the unfolded state, the first housing and the middle housing are in engaged connection by the meshing parts.

17. The foldable screen according to claim 1, wherein meshing parts are arranged on ends of the middle housing and the second housing; and
when the foldable screen is in the unfolded state, the middle housing and the second housing are in engaged connection by the meshing parts.

18. The foldable screen according to claim 1, wherein a central line in a length direction of the screen assembly is a symmetry axis, the foldable screen comprises two groups of linked connection assemblies, and the two groups of linked connection assemblies are symmetrically arranged on two sides of the symmetry axis.

19. An electronic device, comprising a foldable screen, wherein the foldable screen comprises a screen assembly and a housing assembly, the housing assembly comprises at least three housings, and the screen assembly covers the at least three housings;
the foldable screen comprises linked connection assemblies, any two adjacent housings in the at least three housings are connected by the linked connection assemblies, and the at least three housings are unfolded or folded at the same time by the linked connection assemblies;
the at least three housings form at least one group of linked housings, comprising a first housings, a middle housing and a second housing which are connected with each other; and
the linked connection assemblies comprise a first connection part, an adjusting connection part and a second connection part, the first housing is rotatably connected with the middle housing by the first connection part, and the second housing is rotatably connected with the middle housing by the second connection part, the adjusting connection part is connected with the middle housing, and the adjusting connection part is connected with the first connection part and the second connection part respectively.

* * * * *

UNITED STATES PATENT AND TRADEMARK OFFICE
CERTIFICATE OF CORRECTION

PATENT NO. : 11,775,012 B2
APPLICATION NO. : 17/565740
DATED : October 3, 2023
INVENTOR(S) : Jianwei Liu It is certified that error appears in the above-identified patent and that said Letters Patent is hereby corrected as shown below:

In the Specification

In Column 1, Line 24, delete "meets" and insert -- meet --, therefor.
In Column 7, Line 24, delete "to an" and insert -- to a --, therefor.
In Column 10, Line 41, delete "in a" and insert -- on a --, therefor.

In the Claims

In Column 13, Line 47, in Claim 1, delete "at last three" and insert -- at least three --, therefor.

Signed and Sealed this
Twenty-sixth Day of December, 2023

Katherine Kelly Vidal
Director of the United States Patent and Trademark Office